(12) United States Patent  
Alpert et al.

(10) Patent No.: US 9,071,934 B2  
(45) Date of Patent: Jun. 30, 2015

(54) OPTIMIZING LOCATION SYSTEM CONFIGURATION EXCHANGES THROUGH DYNAMIC LOCATION WORKING PROFILES

(71) Applicant: Intel Corporation, Santa Clara, CA (US)

(72) Inventors: Yaron Alpert, Hod Hasharoni (IL); Tirosh Levin, Hadera (IL)

(73) Assignee: INTEL CORPORATION, Santa Clara, CA (US)

( * ) Notice: Subject to any disclaimer, the term of this patent is extended or adjusted under 35 U.S.C. 154(b) by 187 days.

(21) Appl. No.: 13/727,350

(22) Filed: Dec. 26, 2012

(65) Prior Publication Data

US 2014/0179343 A1     Jun. 26, 2014

(51) Int. Cl.
*H04W 4/02* (2009.01)

(52) U.S. Cl.
CPC .................................... *H04W 4/023* (2013.01)

(58) Field of Classification Search
USPC ....................................................... 455/456.1
See application file for complete search history.

(56) References Cited

U.S. PATENT DOCUMENTS

| 2004/0051664 | A1 | 3/2004 | Frank |
| 2004/0242197 | A1 | 12/2004 | Fontaine |
| 2009/0143018 | A1 | 6/2009 | Anderson et al. |
| 2011/0051916 | A1 | 3/2011 | Elliott |
| 2011/0113084 | A1 | 5/2011 | Ramnani |
| 2014/0280267 | A1* | 9/2014 | Perlegos ....................... 707/758 |

OTHER PUBLICATIONS

International Search Report and Written Opinion, mail date Oct. 18, 2013, PCT/ISA/210, PCT/ISA/220, PCT/ISA/237, total of 9 pages.

* cited by examiner

*Primary Examiner* — Diane Mizrahi  
(74) *Attorney, Agent, or Firm* — Pillsbury Winthrop Shaw Pittman LLP

(57) ABSTRACT

A wireless location information system, device, and method are presented that include location system components (LSCs) that perform location-based operations; one or more location work profiles (LWPs) associated with each of the LSCs, in which the LWPs include configuration information of the LSCs; and a controller that controls the configuration information exchanges between the LSCs. As such, the controller component provides, in advance, one or more LWPs to each LSC, in which each of the LWPs is designated with a unique identifier and, upon a change in operational status, the controller provides the LSCs with only the identifier of the LWP affected by the change.

20 Claims, 3 Drawing Sheets

OPTIMIZING LOCATION SYSTEM CONFIGURATION EXCHANGES THROUGH DYNAMIC LOCATION WORKING PROFILES

TECHNICAL FIELD

This disclosure relates generally to the field of wireless communications, and in particular, to wireless location/positioning systems and methods.

BACKGROUND ART

Wireless devices incorporating location/positioning features and services have recently experienced a great deal of interest and popularity. Such features/services may provide location information for outdoor areas based on global-navigation-satellite-systems and global positioning systems (e.g., GNSS, GPS, GLONASS, Galileo, COMPASS, etc.) as well as for indoor environments based on wireless communication technologies (e.g., Wi-Fi, WiMax, WLAN, WWAN, etc.).

Wireless devices equipped with such location/positioning features/services include a number of system location components and modules configured to perform various operations, such as, for example, measurements, location calculation, location communications, etc. Moreover, each of these components and modules also have associated profile information regarding their operation, characteristics, and service/performance parameters. It will be appreciated that user-based activities and system-based conditions often change, thereby requiring updates and changes to profile information and component/module operations. However, these changes may occur with such repetitiveness that configuration updates and operation modifications may strain wireless device resources, such as, power, timing, internal bus loads, processor MIPS, memory, etc.

DETAILED DESCRIPTION

Figure 1:
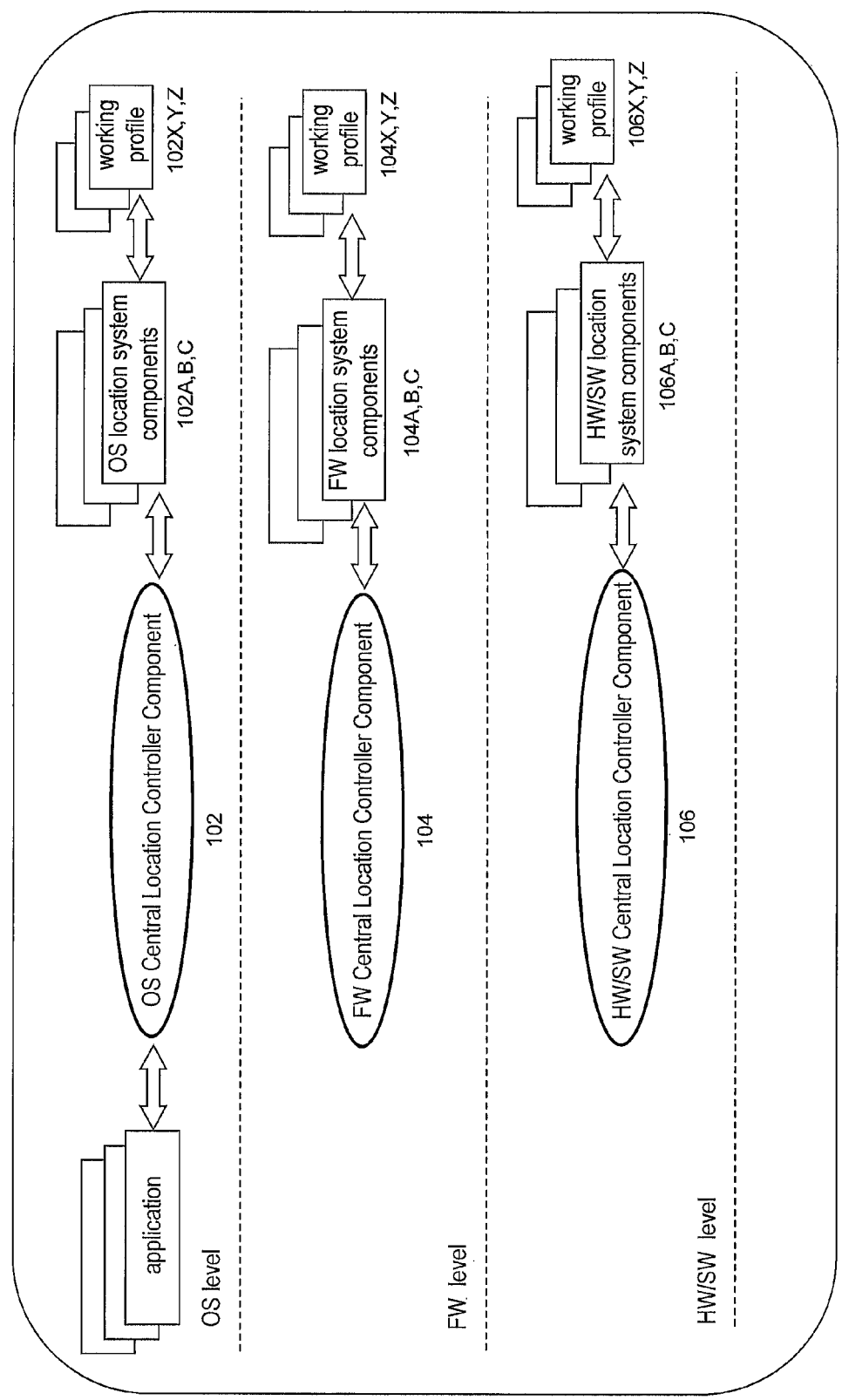
FIG. 1 depicts an overview of location information system attributes of a wireless location device, in accordance with various aspects and principles of the present disclosure.

In the description that follows, like components have been given the same reference numerals, regardless of whether they are shown in different embodiments. To illustrate an embodiment(s) of the present disclosure in a clear and concise manner, the drawings may not necessarily be to scale and certain features may be shown in somewhat schematic form. Features that are described and/or illustrated with respect to one embodiment may be used in the same way or in a similar way in one or more other embodiments and/or in combination with or instead of the features of the other embodiments.

In accordance with various embodiments of this disclosure, what is presented is a wireless location information device that includes a plurality of location system components (LSCs) that perform location-based operations; one or more location work profiles (LWPs) associated with each of the LSCs, in which the LWPs include configuration information of the LSCs; and a controller that controls the configuration information exchanges between the LSCs. As such, the controller component provides, in advance, one or more LWPs to each LSC, in which each of the LWPs is designated with a unique identifier and, upon a change in operational status, the controller provides the LSCs with only the identifier of the LWP affected by the change.

In another embodiment, a method is presented that provides one or more location work profiles (LWPs) associated with each of a plurality of location system components (LSCs) configured to perform location-based operations, the LWPs including configuration information of the LSCs and controlling configuration information exchanges between the LSCs. As such, the controlling of the exchanges includes providing, in advance, one or more LWPs to each LSC, designating each of the LWPs with a unique identifier and, upon a change in operational status, providing the LSCs with only the identifier of the LWP affected by the change.

These and other features and characteristics, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of claims. As used in the specification and in the claims, the singular form of "a", "an", and "the" include plural referents unless the context clearly dictates otherwise.

FIG. 1 depicts an organizational overview of location information system attributes of a wireless location device 100, in accordance with various aspects and principles of the present disclosure. By way of illustration, wireless location device 100 may be configured to operate with one or more wireless location/positioning technologies, such as, for example, GNSS, GPS, GLONASS, Galileo, COMPASS, Wi-Fi, WiMax, WLAN, WWAN, etc. or any other implementation of a suitable wireless technology and/or standard capable of providing positioning information. Each of these technologies may require multiple location system components and modules (LSCs) that perform various operations, such as, for example, location origin measurement, location calculation, location communications, etc. The LSCs may take the form of firmware, software, and hardware and/or a combination thereof. In certain embodiments, LSCs may be organized in accordance with OSI levels, such as application/operating system-level LSCs 102A, B, C; firmware-level LSCs 104A, B, C; and hardware/software-level LSCs 106A, B, C, as shown in FIG. 1.

In turn, the LSCs have associated profile information, such as, Location Work Profiles (LWPs), that contain configuration information regarding the LSCs' individual working points, operation, characteristics, and service/performance parameter information. Such configuration information may include, but not be limited to, frequency data, power profile, power level, power level states (active, idle, sleep, etc.), timing data, received signal quality, frequency synchronization, signal power synchronization, wave propagation parameters, propagation time, quality of service (QoS), level of service (LoS), accuracy of location information, etc. The LSCs may be organized as application/operating system-level LWPs 102X, Y, Z; firmware-level LWPs 104X, Y, Z; and hardware/software-level LWPs 106X, Y, Z, as shown in FIG. 1.

The LSCs are controlled by central location controller component (CLCC). The CLCC is responsible for invoking, setting, negotiating, commanding, and modifying the LSCs and may be organized at the application/operating system-level, such as, CLCC 102; at the firmware-level, such as, CLCC 104; or at the hardware/software-level, such as, CLCC 106.

Figure 2:
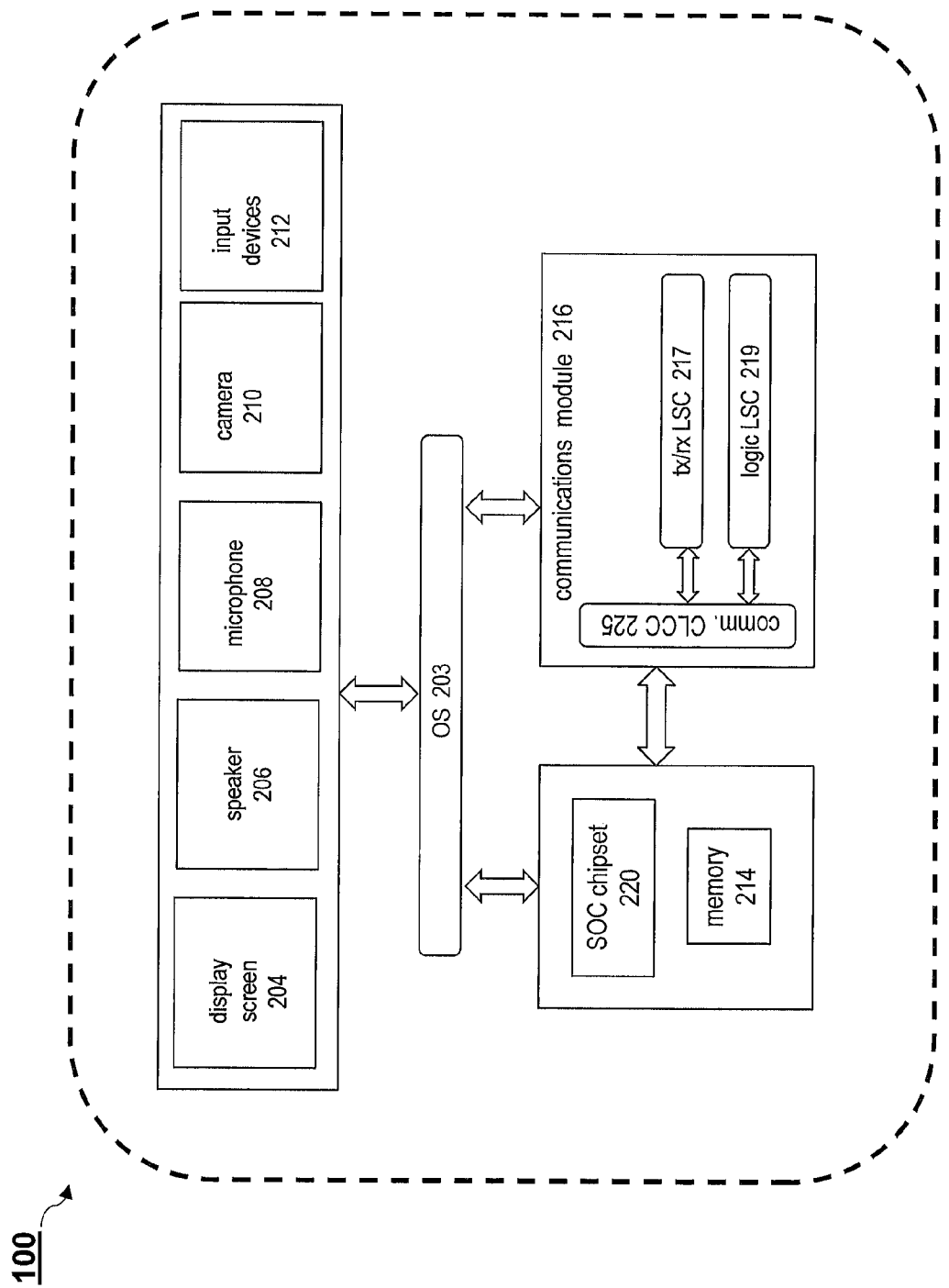
FIG. 2 depicts a wireless location device, in accordance with various aspects and principles of the present disclosure.

With this said, FIG. 2 depicts wireless location device 100 in greater detail, in accordance with various aspects of the present disclosure. Wireless location device 100 is a device configured to conduct wireless communications as well as provide location/position information under a variety of standards and protocols In so doing, wireless location device 100 may comprise, for example, a cellular/smart phone, laptop, mobile device, tablet computer, personal communication system (PCS) device, personal digital assistant (PDA), personal audio device (PAD), navigation device, etc.

In the illustrative non-limiting example, wireless communication device 100 may include a variety of peripherals, such as, for example, display screen 204, speaker 206, microphone 208, camera 210, input devices 212, as well as memory 214, communication module 216, and a system-on-chip (SoC) chipset 220. The wireless communication device 100 may also include a bus infrastructure and/or other interconnection means to connect and communicate information between the various components of device 100.

In some embodiments, SoC 220 may be part of a core processing or computing unit of wireless location device 100, and is configured to receive and process input data and instructions, provide output and/or control other components of device 100 in accordance with embodiments of the present disclosure. SoC 220 may include a microprocessor, a memory controller, a memory and other components. The microprocessor may further include a cache memory (e.g., SRAM), which along with the memory of SoC 220 may be part of a memory hierarchy to store instructions and data. The microprocessor may also include one or more logic modules such as a field programmable gate array (FPGA) or other logic array. Communication between the SoC 220's microprocessor and memory may be facilitated by the memory controller (or chipset), which may also facilitate communication with the peripheral components.

Memory 214 of wireless location device 100 may be a dynamic storage device coupled to the bus infrastructure and configured to store information, instructions, and programs to be executed by processors of SoC 220 and/or other processors (or controllers) associated with device 100. Some of all of memory 214 may be implemented as Dual In-line Memory Modules (DIMMs), and may be one or more of the following types of memory: Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDECSRAM, PCIOO SDRAM, Double Data Rate SDRAM (DDR SDRAM), Enhanced SDRAM (ES-DRAM), SyncLink DRAM (SLDRAM), Direct Rambus DRAM (DRDRAM), Ferroelectric RAM (FRAM), or any other type of memory device. Wireless location device 100 may also include read only memory (ROM) and/or other static storage devices coupled to the bus infrastructure and configured to store static information and instructions for processors of SoC 220 and/or other processors (or controllers) associated with device 100.

Communication module 216 is configured to achieve wireless communications by establishing communication links via an RF antenna and transmit/receive information, including positioning information, across the links. In some embodiments, communication module 216 may comprise transceiver LSC 217 and communication logic LSC 219, both of which may be organized as hardware/software-level LSCs. As noted above, as LSC 217 and LSC 219 may be controlled by communications CLCC 225.

It will be appreciated that transceiver LSC 217 and communication logic LSC 219 may comprise transceiver, transponder, modulator circuitry, demodulator circuitry, memory circuitry, interfaces, etc. In so doing, transceiver LSC 217 and communication logic LSC 219 may also have associated hardware/software-level LWPs that contain configuration information regarding their individual working points, operation, characteristics, and service/performance parameter information. Moreover, communication module 216 as well as LSC 217, LSC 219, and CLCC 225 may communicate with each other and other components/modules such as SOC 220, memory 214, etc. via the bus infrastructure.

As noted above, user-based activities and system-based conditions often change, thereby requiring changes to LWP information and corresponding LSC operations while attempting to maintain continuous connectivity and location information provisioning. By way of example, LWP information and LSC operations may change based on user movement, battery to AC conversions, RF interference, area security, etc.

Typically, such changes require the CLCC to perform system-level location configuration exchanges between the LSCs. In other words, the CLCC executes location configuration requests and commands in an effort to exchange numerous sets of system-level location configuration information, including LWPs, across the LSCs.

To combat such time, resource, and energy-intensive system configuration exchanges, what is proposed is the optimization of system configuration exchanges by employing a dynamic location work profiling (DLWP) scheme. The DLWP scheme provides a methodology for predefining sets of LWPs and dynamically updating the LWPs by providing LWP IDs, without having to rely on system-level location configuration exchanges for every update.

In some embodiments, the DLWP scheme comprises the CLCC providing, in advance, a set of LWPs to each relevant LSC. The LWPs may contain configuration parameters and/or other information corresponding to a work point, several work points, characteristics, and expected operations of the relevant LSCs. Each of the LWPs will be designated an identifier (e.g., name, index, reference number, etc.).

Upon the CLCC receiving an indication of a change or update regarding work modes or operations, the CLCC will notify each relevant LSC of the pertinent LWP identifier associated with the change/update only. Because all other configuration information of the remaining LWPs has previously been provided to the relevant LSCs, only the LWP identified as having the changes is supplied to the LSCs.

In addition or in the alternative, the CLCC and LSC may negotiate LWP configuration parameters and operational attributes, at system initialization, to further achieve configuration optimization. In particular, upon initialization, the CLCC may request the LSCs to provide working points and configuration parameters that correspond to different LWPs in view of various predetermined conditions. As such, in response to a change in conditions, the CLCC may automatically invoke the appropriate LWP to service the relevant LSCs.

Moreover, CLCCs that reside at different levels, such as, OS CLCC 102, FW CLCC 104, and HW/SW CLCC 106 depicted in FIG. 1, may exchange LWP requirements to its corresponding LSCs and to other CLCCs, depending on its own LWP parameters and the LWP parameters of the expected CLCCs.

In some embodiments, a CLCC may not be present to control an LSC or set of LSCs. However, an LSC may be communicatively coupled to another LSC (e.g. peer LSC) by virtue of a particular configuration, operation, and/or parameter. For example, in response to a transceiver LSC detecting a certain amount of interference, a power LSC may perform power level adjustments. As such, depending on its own LWP parameters and the expected peers' LWP parameters, the DLWP scheme enables each LSC to exchange LWP configuration information/requirements to its peer LSC, such as, for example, work pointing, configuration. Thus, each LSC is capable of optimizing and adjusting its LWPs based on peer requests.

In addition or in the alternative, in the absence of a CLCC, the LSCs may negotiate LWP configuration parameters and operational attributes to achieve configuration optimization. That is, the LSCs may communicate with each other to provide working points and configuration parameters that correspond to different LWPs in view of various predetermined conditions. As such, in response to a change in conditions, the LWPs may automatically initiate the appropriate LWP to service the relevant LSCs.

Figure 3:
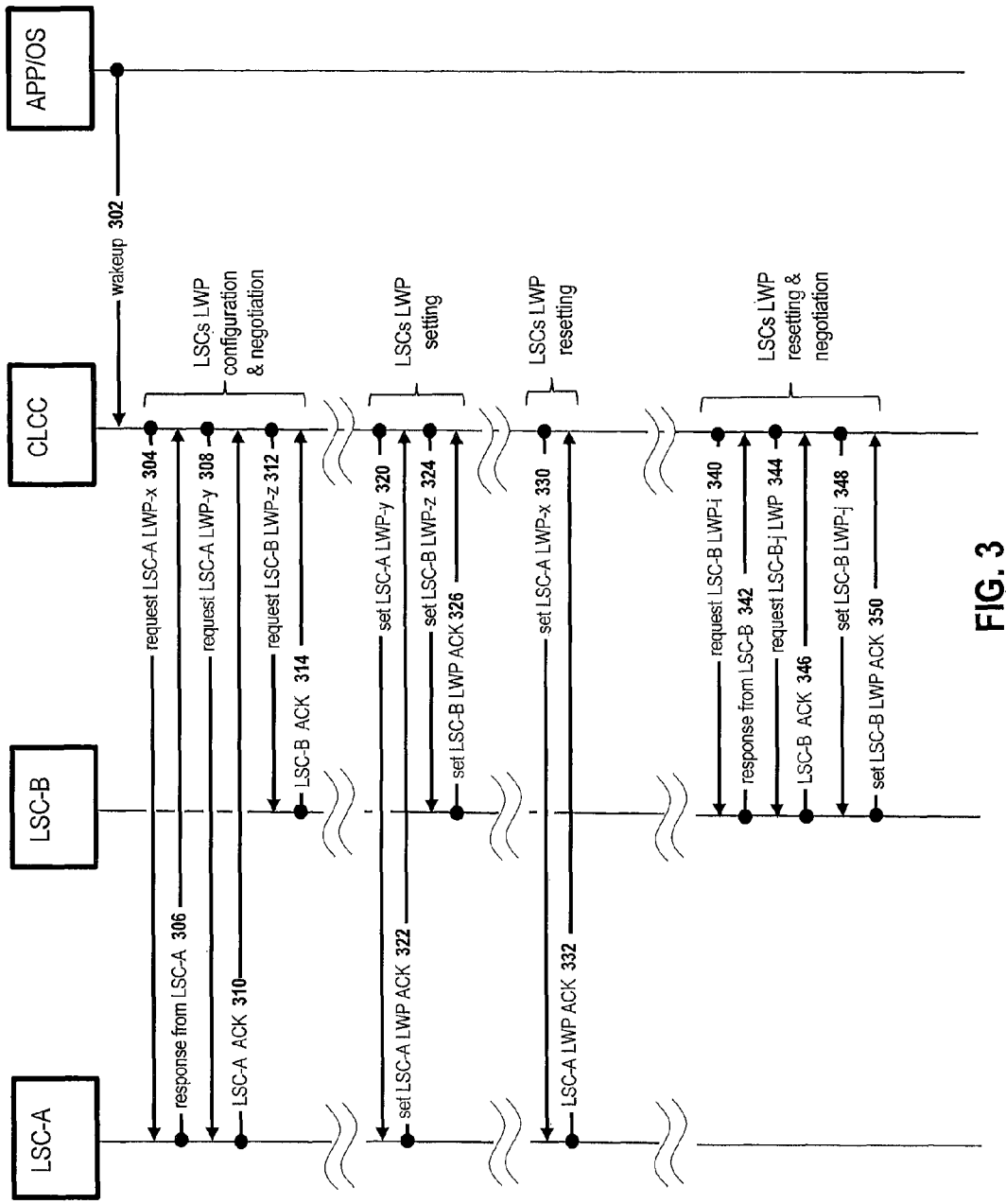
FIG. 3 depicts a message flow diagram illustrating an exemplary process of optimizing system configuration exchanges by employing dynamic location work profiling, in accordance with various aspects and principles of the present disclosure.

FIG. 3 depicts a message flow diagram illustrating process 300 for optimizing system configuration exchanges by employing the DWLP scheme, in accordance with various aspects and principles of the present disclosure. Process 300 is represented as a transactional message flow diagram illustrating transactional messages between a CLCC and LSC-A, LSC-B for a configuration/negotiation mode, setting mode, resetting mode, and resetting/negotiation mode.

For the configuration and negotiation mode of process 300, upon entering into the system wake-up state (initiated at the OS level by message 302), the CLCC submits a request to LSC-A for a particular profile designated with identifier LWP-x and containing a certain set of configuration parameters. As discussed above, the DLWP scheme enables the CLCC to provide, in advance, a set of LWPs to each relevant LSC, in which each of the LWPs will have a designated identifier (e.g., name, index, reference number, etc.). At this stage, the CLCC submits a request as a prelude to setting LSCA to use LWP-x.

So, in response to the request, LSC-A may respond with an acknowledgement message (ACK) or may respond with an indication of an issue with the particular profile LWP-x, as shown by message 306. As part of the negotiation process, CLCC may submit an additional request to LSC-A for another profile, LWP-y, as shown by message 308. In this embodiment, LSC-A responds with an ACK message indicating that it can provide LWP-y, as shown by message 310.

At message 312, CLCC submits a request to LSC-B for a particular profile designated as LWP-z and, at message 314, LSC-A responds with an ACK message indicating that it can provide LWP-z.

For the setting mode of process 300, the CLCC forwards a command to LSC-A to set its configuration information in accordance with profile LWP-y, at message 320. In response, LSC-A acknowledges the setting by responding with an ACK, at message 322. Similarly the CLCC forwards a command to LSC-B to set its configuration information in accordance with profile LWP-z, at message 324, in which LSC-B acknowledges the setting, at message 326.

As discussed above, upon the CLCC determining a change or update regarding operations, the DLWP scheme enables the CLCC to notify each relevant LSC of the pertinent LWP identifier to reset their profiles. As such, for the resetting mode of process 300, the CLCC forwards a command to LSC-A to set its configuration information in accordance with another profile, LWP-x, at message 330. In response, LSC-A acknowledges the setting to another profile by responding with an ACK, at message 332.

Finally, as noted above, the DWLP scheme allows for negotiations during system operations. To this end, for the resetting and negotiation mode of process 300, at message 340, the CLCC submits a request to LSC-B for a particular profile LWP-i to which LSC-B responds with an indication of an issue with that particular profile, as shown by message 342. As part of the negotiations, the CLCC submits an additional request to LSC-B for another profile, LWP-j, as shown in message 344. In this case, LSC-B responds back an ACK message indicating that it can provide LWP-j, as shown by message 346.

Consequently, the CLCC forwards a command to LSC-B to set its configuration information in accordance with profile LWP-j, at message 348. In response, LSC-B acknowledges the setting by responding with an ACK, at message 350.

Having thus described the basic concepts, it will be rather apparent to those skilled in the art after reading this detailed disclosure that the foregoing detailed disclosure is intended to be presented by way of example only and is not limiting. Various alterations, improvements, and modifications will occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure. In addition, the term "logic" is representative of hardware, firmware, software (or any combination thereof) to perform one or more functions. For instance, examples of "hardware" include, but are not limited to, an integrated circuit, a finite state machine, or even combinatorial logic. The integrated circuit may take the form of a processor such as a microprocessor, an application specific integrated circuit, a digital signal processor, a micro-controller, or the like.

Furthermore, the recited order of processing elements or sequences, or the use of numbers, letters, or other designations therefore, is not intended to limit the claimed processes and methods to any order except as can be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, as the following claims reflect, inventive embodiments lie in less than all features of a single foregoing disclosed embodiment. Thus, the claims following the detailed description are hereby expressly incorporated into this detailed description.

What is claimed is:

1. A wireless location information device, comprising:
   one or more physical processors programmed with program instructions that, when executed by the one or more physical processors, cause the one or more processors system to implement:
      a plurality of location system components (LSCs) configured to perform location-based operations, wherein one or more location work profiles (LWPs) are associated with each of the LSCs, the LWPs including configuration information of the LSCs; and
      a controller component configured to control configuration information exchanges between the LSCs,
      wherein, the controller component provides, in advance, one or more LWPs to each LSC, each of the LWPs being designated with a unique identifier and, upon a change in operational status, the controller provides the LSCs with only the identifier of the LWP affected by the change.

2. The wireless location information device of claim 1, wherein the configuration information of the LWPs includes one or more of the following: working points, operation, characteristic information, service/performance parameter information, frequency data, power level, power level states, timing data, received signal quality, frequency synchronization, signal power synchronization, wave propagation parameters, propagation time, quality of service (QoS), level of service (LoS), or accuracy of location information.

3. The wireless location information device of claim 1, wherein the controller negotiates with the LSCs to provide configuration parameters that correspond to different LWPs based on different predetermined conditions.

4. The wireless location information device of claim 1, further comprising a plurality of controllers operating at different Open Systems Interconnection (OSI) levels in which each one of the plurality of controllers exchanges LWP configuration information with LSCs that correspond to that one of the plurality of controllers, to other controllers, and to other LSCs.

5. The wireless location information device of claim 1, wherein the LSCs exchange LWP configuration information with peer LSCs, without the intervention of the controller.

6. The wireless location information device of claim 1, wherein the LSCs negotiate LWP configuration information with peer LSCs, without intervention of the controller.

7. The wireless location information device of claim 1, wherein the control of the configuration information exchanges further comprises the controller forwarding a request message to an LSC for a particular LWP based on the LWP identifier and awaiting an acknowledgement message from the LSC.

8. The wireless location information device of claim 1, wherein the control of the configuration information exchanges further comprises the controller forwarding a command message to an LSC to set configuration information of the LSC in accordance with a particular LWP based on the LWP identifier and awaiting an acknowledgement message from the LSC.

9. The wireless location information device of claim 7 wherein, in response to not receiving the acknowledgement message from the LSC relative to the request message, the controller negotiates configuration information exchanges by forwarding an additional request message to the LSC for a different LWP based on a different LWP identifier and awaiting an acknowledgement message from the LSC.

10. The wireless location information device of claim 8 wherein, in response to not receiving the acknowledgement message from the LSC relative to the set command message, the controller resets configuration information by forwarding an addition set command message to the LSC to set configuration information of the LSC in accordance with a different LWP based on a different LWP identifier and awaiting an acknowledgement message from the LSC.

11. A method comprising:
   providing, using one or more physical processors, one or more location work profiles (LWPs) associated with each of a plurality of location system components (LSCs) configured to perform location-based operations, the LWPs including configuration information of the LSCs; and
   controlling, using the one or more physical processors, configuration information exchanges between the LSCs, wherein, the controlling of the exchanges includes providing, in advance, one or more LWPs to each LSC, designating each of the LWPs with a unique identifier and, upon a change in operational status, providing the LSCs with only the identifier of the LWP affected by the change.

12. The method of claim 11, wherein the configuration information of the LWPs includes one or more of the following: working points, operation, characteristic information, service/performance parameter information, frequency data, power level, power level states, timing data, received signal quality, frequency synchronization, signal power synchronization, wave propagation parameters, propagation time, quality of service (QoS), level of service (LoS), or accuracy of location information.

13. The method of claim 11, further comprising negotiating with the LSCs to provide configuration parameters that correspond to different LWPs based on different predetermined conditions.

14. The method of claim 11, further comprising exchanging LWP configuration information with components operating at different Open Systems Interconnection (OSI) levels.

15. The method of claim 11, further comprising the LSCs exchanging LWP configuration information with peer LSCs, without the intervention of the controller.

16. The method of claim 11, further comprising the LSCs negotiating LWP configuration information with peer LSCs, without intervention of the controller.

17. The method of claim 11, wherein the control of the configuration information exchanges further comprises forwarding a request message to an LSC for a particular LWP based on the LWP identifier and awaiting an acknowledgement message from the LSC.

18. The method of claim 11, wherein the control of the configuration information exchanges further comprises forwarding a command message to an LSC to set configuration information of the LSC in accordance with a particular LWP based on the LWP identifier and awaiting an acknowledgement message from the LSC.

19. The method of claim 17 wherein, in response to not receiving the acknowledgement message from the LSC relative to the request message, negotiating configuration information exchanges by forwarding an additional request message to the LSC for a different LWP based on a different LWP identifier and awaiting an acknowledgement message from the LSC.

20. The method of claim 18 wherein, in response to not receiving the acknowledgement message from the LSC relative to the set command message, resetting the configuration information by forwarding an addition set command message to the LSC to set configuration information of the LSC in accordance with a different LWP based on a different LWP identifier and awaiting an acknowledgement message from the LSC.

* * * * *